(12) United States Patent
Tomita

(10) Patent No.: US 6,912,614 B2
(45) Date of Patent: Jun. 28, 2005

(54) DISK ARRAY APPARATUS AND DATA RESTORING METHOD USED THEREIN

(75) Inventor: Haruo Tomita, Iruma (JP)

(73) Assignee: Kabushiki Kaisha Toshiba, Tokyo (JP)

(*) Notice: Subject to any disclaimer, the term of this patent is extended or adjusted under 35 U.S.C. 154(b) by 206 days.

(21) Appl. No.: 10/231,027

(22) Filed: Aug. 30, 2002

(65) Prior Publication Data

US 2003/0105921 A1 Jun. 5, 2003

(30) Foreign Application Priority Data

Nov. 30, 2001 (JP) ........................................ 2001-367818

(51) Int. Cl.$^7$ .............................................. G06F 12/10
(52) U.S. Cl. ........................... 711/4; 711/114; 711/206; 711/157
(58) Field of Search ............................ 711/4, 114, 206, 711/157

(56) References Cited

U.S. PATENT DOCUMENTS

| | | | |
|---|---|---|---|
| 5,303,244 A | * 4/1994 | Watson | ........................... 714/5 |
| 6,219,752 B1 | 4/2001 | Sekido | |
| 6,233,648 B1 | 5/2001 | Tomita | |
| 6,571,351 B1 | * 5/2003 | Mitaru et al. | ................... 714/6 |
| 2002/0188655 A1 | * 12/2002 | Brown et al. | ................ 709/201 |

FOREIGN PATENT DOCUMENTS

| | | |
|---|---|---|
| JP | 5-88988 | 4/1993 |
| JP | 11-24849 | 1/1999 |
| JP | 11-024849 | 1/1999 |
| JP | 2000-010738 | 1/2000 |
| JP | 2000-47832 | 2/2000 |

OTHER PUBLICATIONS

U.S. Appl. No. 10/231,157, filed Aug. 30, 2002, to Tomita.
U.S. Appl. No. 10/231,247, filed Aug. 30, 2002, to Tomita.
U..S. Appl. No. 10/231,349, filed Aug. 30, 2002, to Tomita.

* cited by examiner

*Primary Examiner*—Jack A. Lane
(74) *Attorney, Agent, or Firm*—Finnegan, Henderson, Farabow, Garrett & Dunner, L.L.P.

(57) ABSTRACT

A controller refers to an address translation table and searches for the logical address of a valid logical block used by a host computer. Then, the controller reads from a disk array only a physical stripe that includes the physical block of a physical address corresponding to the valid logical address. Based on the read physical stripe, the controller restores data of a failing disk drive and writes the restored data in a spare disk drive that is used in place of the failing disk drive.

13 Claims, 5 Drawing Sheets

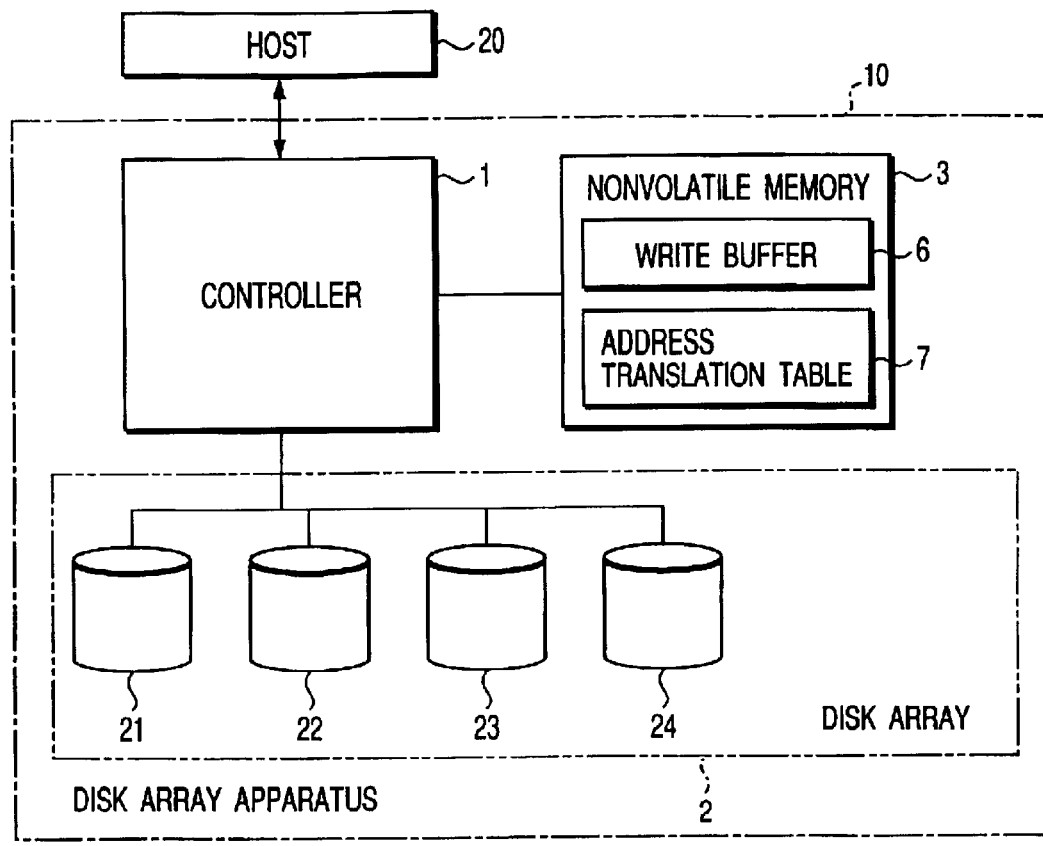
F I G. 1
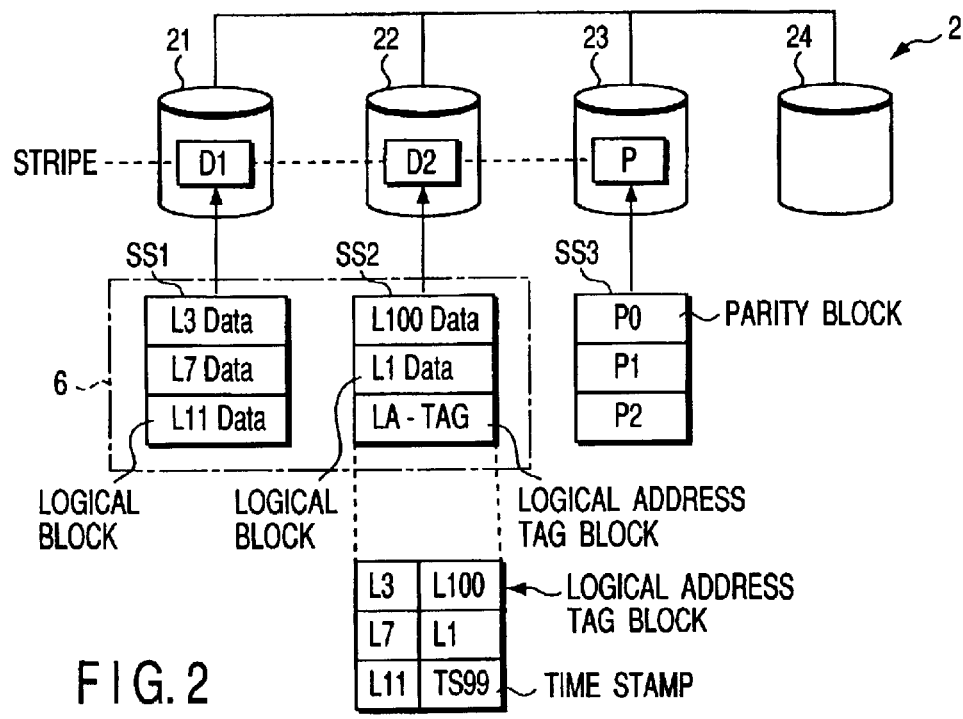
F I G. 2

| LA# | ST# | BLK# | TS# | F |
|-----|------|------|------|------|
| L0 | 100 | 3 | 99 | 1 |
| L1 | 1000 | 4 | 999 | 1 |
| L2 | 1 | 5 | 21 | 0 |
| ⋮ | ⋮ | ⋮ | ⋮ | ⋮ |
| Li | NULL | NULL | NULL | NULL |
| ⋮ | ⋮ | ⋮ | ⋮ | ⋮ |
FIG. 3
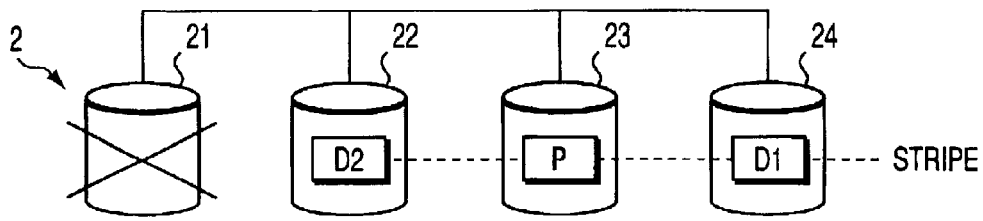
FIG. 4
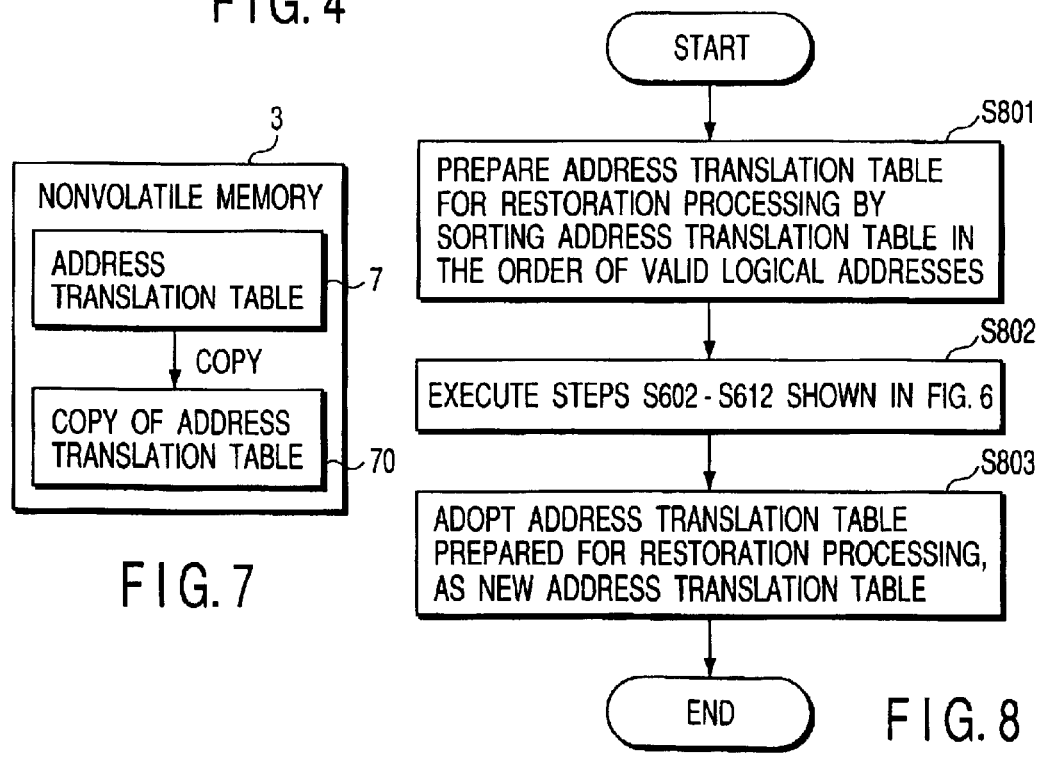
FIG. 7
FIG. 8

DISK ARRAY APPARATUS AND DATA RESTORING METHOD USED THEREIN

CROSS-REFERENCE TO RELATED APPLICATIONS

This application is based upon and claims the benefit of priority from the prior Japanese Patent Application No. 2001-367818, filed Nov. 30, 2001, the entire contents of which are incorporated herein by reference.

BACKGROUND OF THE INVENTION

1. Field of the Invention

The present invention relates to a disk array apparatus comprising a plurality of disk drives, more specifically to a disk array apparatus which can restore data in a very efficient way if one of the disk drives of the disk array apparatus fails. The present invention also relates to a data restoring method used in the disk array apparatus.

2. Description of the Related Art

Various types of disk array apparatuses comprising a disk array (a typical example of which is a RAID [Redundant Array of Inexpensive Disks, Redundant Array of Independent Disks]) have been developed. In general, a disk array is accessed in units of one physical stripe. U.S. Pat. Nos. 6,219,752 and 6,233,648 (hereinafter referred to as "prior art documents") disclose a high-speed write method in which data is written in a disk array apparatus. In the write method, data to be updated, which is stored in an area corresponding to an update (rewrite) command issued by a host computer, is not rewritten. Instead, update data is stored in a write buffer. When a predetermined amount of update data has been stored in the write buffer, they are collectively recorded in an area which is different from the area where the data to be updated is stored, and which is on one of the disk drives of the disk array. This kind of write operation is sometimes called as a delayed write operation.

In general, if one of the disk drives of the disk array fails, the disk array has to be reconstructed using a replacement disk drive (a spare disk drive). To enable this reconstruction, the disk array generally has a redundancy disk configuration known as RAID. Therefore, if one of the disk drives of the disk array having the redundancy disk configuration fails, the redundancy disk configuration has to be reconstructed quickly. For this quick reconstruction, the conventional disk array apparatuses that use the high-speed write method disclosed in the prior art documents restore data as described below, in response to the failure of one disk drive. That is, all physical stripes on the disk array are sequentially read. Then, in units of one physical stripe, data in a logical block and parity data are restored. The resultant data is written in a new disk array including the spare disk drive.

The conventional data restoring method, however, is disadvantageous in that the time needed for the data restoration is long depending upon the data capacity of the disk array. This is a problem since future disk arrays are expected to have an increased capacity.

Jpn. Pat. Appln. KOKAI Publication No. 11-24849 does not disclose such a high-speed write method as described above, but shows a disk array apparatus which restores data recorded in a disk array. In the data restoring method shown in the Japanese reference, data of the disk array is restored based on a file management table the operating system (OS) uses. The management table is used by the OS to determine whether the logical data in the disk array apparatus is valid or invalid and to manage a free area in the disk array apparatus. Where the restoring method using the file management table is applied to the disk array apparatus, the OS has to be provided with an interface with reference to the disk array apparatus. In addition, the internal structures of the OS and file system must be known. Furthermore, different disk array apparatuses must be prepared for different OS's, and the compatibility among the disk arrays of different OS's must be taken into consideration.

BRIEF SUMMARY OF THE INVENTION

The present invention has been conceived in consideration of the above, and is intended to provide a disk array apparatus and a data restoring method used therein, which can cope with the situation where one of the disk drives of the disk array apparatus fails by restoring data in a very short time, with no need to modify the OS, file system or device driver and with the compatibility to different-OS disk array apparatuses maintained.

According to one aspect of the present invention, there is provided a disk array apparatus comprising a redundancy-disk-configuration disk array which includes a plurality of disk drives and which is regarded as one logical disk drive by a host computer. In addition to this disk array, the disk array apparatus comprises storing means, retrieving means, determining means, reading means, restoring means and writing means. The storing means stores an address translation table, and this table includes address translation information for translating logical addresses of valid logical blocks used by the host computer into physical addresses showing where in the disk array those logical blocks are stored. The retrieving means retrieves a valid logical address in accordance with the address translation table, if one of the disk drives of the disk array fails and the disk array is reconstructed using a spare disk drive in place of the failing disk drive. The reading means determines whether the failing disk drive contains a physical block of the physical address corresponding to the logical block of the valid logical address retrieved by the retrieving means. This determination is based on the address translation table. If the failing disk drive contains the physical block corresponding to the valid logical address, the retrieving means reads the physical stripe containing the physical block. The restoring means restores data of the failing disk drive based on the physical stripe read by the reading means. The writing means writes the data restored by the restoring means in the spare disk drive.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram illustrating a computer system which is provided with a disk array apparatus according to one embodiment of the present invention.

FIG. 2 shows an example of 1-stripe data and illustrates how the 1-stripe data is written in the disk drives 21–23 of the disk array 2.

FIG. 3 shows an example of a data structure of the address translation table 7 shown in FIG. 1.

FIG. 4 shows how the disk array 2 is when disk drive 21 fails in the state shown in FIG. 2 and the disk array 2 has been reconstructed using a spare disk drive 24 in place of the disk drive 21.

FIG. 7 is a diagram illustrating an operation of making a copy of the address translation table used in the first modification.

FIG. 8 is a flowchart illustrating the data restoring processing executed in the second modification of the embodiment.

DETAILED DESCRIPTION OF THE INVENTION

Figure 5:
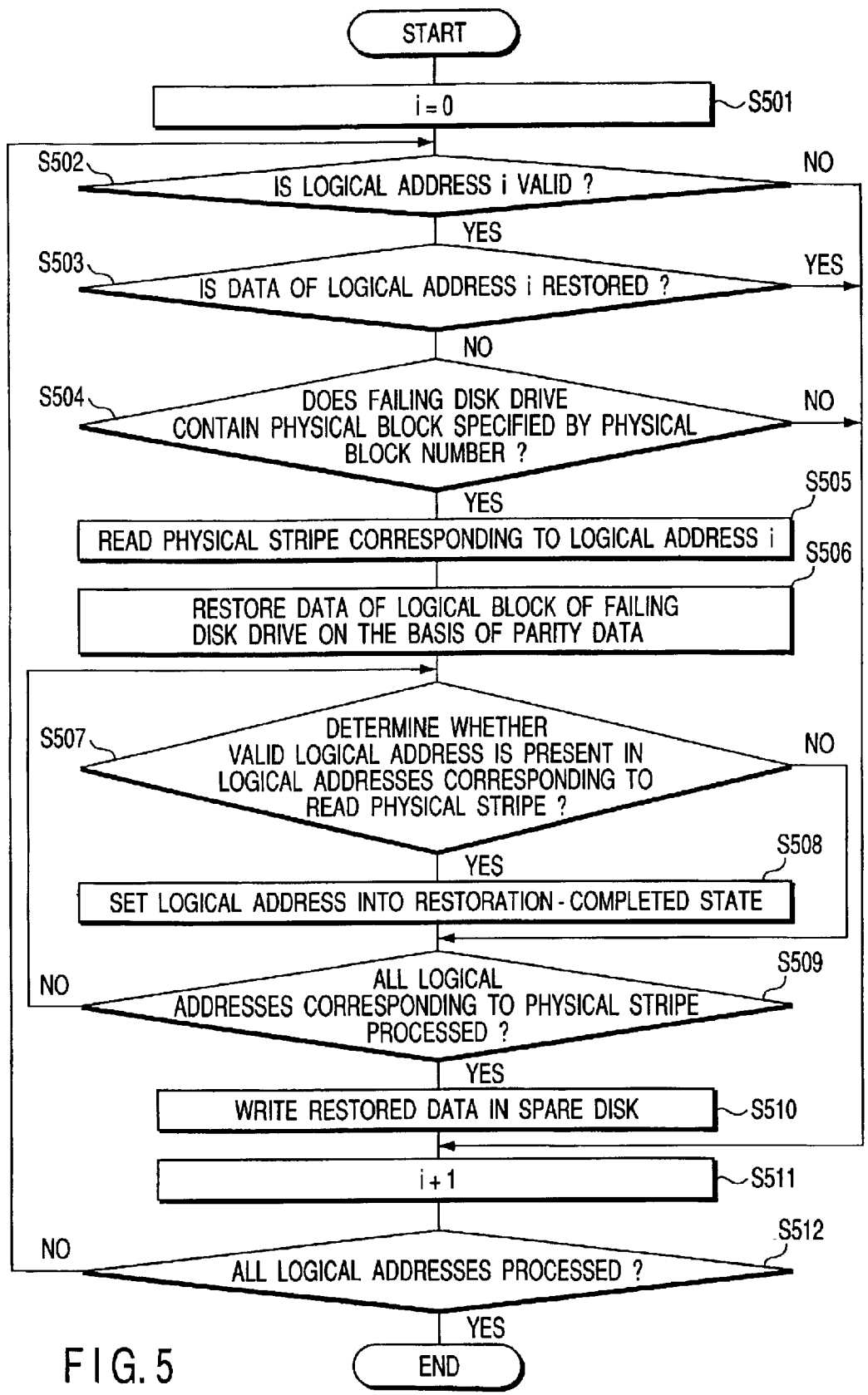
FIG. 5 is a flowchart illustrating the procedures of the data restoring processing according to the embodiment.

A detailed description will be given of embodiments of the present invention with reference to the drawing. FIG. 1 is block diagram illustrating a computer system which is provided with a disk array apparatus according to one embodiment of the present invention. As shown in FIG. 1, a disk array apparatus 10 comprises a controller 1, a disk array 2 and a nonvolatile memory 3. The controller 1 is connected to the disk array 2 and the nonvolatile memory 3.

The disk array 2 includes a plurality of disk drives, for example, three disk drives 21, 22 and 23. The disk array 2 is of a redundancy disk configuration, so that if one of the disk drives 21–23 fails, the data of the failing disk drive can be regenerated (recovered). For the sake of simplicity, it is assumed that disk array 2 is of a redundancy disk configuration according to RAID4. It is also assumed that the predetermined one of disk drives 21–23, for example disk drive 23, serves as a parity disk unit that stores parity data. The disk array 2 is provided with a spare disk drive 24. If one of the disk drives 21–23 fails, the spare disk drive 24 is used in place of the failing disk drive. While the disk drives 21–23 are in operation, this spare disk drive 24 is logically separated from the disk array 2. The spare disk drive 24 may be incorporated into the disk array 2 when one of the disk drives 21–23 fails.

The controller 1 is a disk array controller that controls the disk array 2 and connected to a host computer (hereinafter referred to as a "host") 20. The disk array 2 looks as one logical disk drive from the host 20. A SCSI (Small Computer System Interface) or PCI bus (Peripheral Component Interconnect Bus) may be used as the interface between the host 20 and the controller 1.

The present embodiment will be described based mainly on the configuration shown in FIG. 1. However, those skilled in the art that the present invention could easily apply the present invention to computer systems of other configurations, such as a computer system having a configuration derived from what is shown in FIG. 1, without having to be informed of details of such computer systems. For example, the controller 1 can be realized based on the description in paragraphs [0042]–[0045] in the right column of page 25 of Jpn. Pat. Appln. KOKAI Publication No. 2000-10738, which describes how a disk array controller is realized. According to this publication, a disk array is controlled as follows:

1a) A disk array controller is realized as part of a host computer. For example, the disk array controller is mounted on the main board of the host computer.

1b) A disk array controller is added to an expansion slot of a computer. For example, the disk array controller is realized as an element mounted on a PCI card connected to a PCI slot.

1c) A disk array controller is realized as an external element of a host computer. This method is used in the present embodiment to realize the controller 1 shown in FIG. 1.

1d) A disk array controller is realized based on part of the software executed by the host computer.

Before a detailed description of the configuration in FIG. 1 is given, key terms used in the description of the embodiment will be explained.

2a) Logical Block

A logical block is a data block looked at from the host 20. More specifically, it is a data block which is in a logical disk area of the disk array 2.

2b) Physical Block

A physical block is a block which is physical in the literal sense of the word, and is on the disk array 2. More specifically, it is a data block which is in a physical disk area of the disk array 2. The size of the data block is fixedly determined beforehand.

2c) Logical Address

A logical address is a data address used by the host 20 to show where on the disk array 2 data is stored. The logical address is used as representing where a data block exists in the logical disk area of the disk array 2. That is, the logical address is used as a logical block address indicating the position of the logical block.

2d) Physical Address

A physical address is used to show a physical location of data (a data block) on the disk array 2. The physical address is a physical block address showing the physical location of a data block on the disk array 2. That is, the physical address is a physical block address of a physical block. The physical address is defined by a physical stripe number and a physical block number, which will be described later.

2e) Logical Address Tag

A logical address tag includes a logical address and a time stamp corresponding to each logical block.

2f) Parity Block

A parity block is a data block made up of redundant data corresponding to a plurality of logical blocks.

2g) Logical Address Tag Block

A logical address tag block is a data block including a logical address tag.

2h) Logical Block Number

A logical block number is used by the host 20 and specifies a data block on the disk array 2.

2i) Physical Block Number

A physical block number is a number showing a relative position of a data block in a physical stripe of the disk array 2. The physical block number is unique to each disk drive of the disk array 2.

The controller 1 controls the disk array 2 based on a control program stored in a storage device (not shown), such as a ROM. In addition, the controller 1 manages a write buffer 6 and an address translation table 7 based on the same control program. The write buffer 6 and the address translation table 7 are defined in the rewritable nonvolatile memory 3, for example.

Each of the disk drives 21–23 of the disk array writes data in an amount K times larger than the size of one data block (block size) (K: an integer greater than 0). In other words, each disk drive writes data in units of K blocks. At the time, each of the K blocks of the disk drives 21–23, which correspond to the same physical positions of the disk drives 21–23, is treated as a stripe segment of one physical stripe, so that data is written in the K blocks at the same timing. In the present embodiment wherein the disk array 2 includes three disk drives 21–23, one stripe comprises three stripe segments. Let us assume that the disk array 2 comprises (N+1) disk drives (N is an integer greater than 1 and is equal to 2 in the embodiment shown in FIG. 1) and that the size of one stripe segment is K blocks. In this case, one stripe is made up of (N+K−1) logical blocks, one logical address tag block, and K parity blocks.

The controller 1 uses a high-speed write method similar to that described in the "Background of the Invention." When the host 20 issues an updating (write) request, the controller 1 accumulates update data in the write buffer 6, instead of rewriting the old data stored in the corresponding area of the disk array 2. More specifically, the controller 1 divides the update data into block units and writes them in a free area of the write buffer 6 with high density. This write buffer 6 has a storage capacity corresponding to (1 stripe−1 stripe segment), i.e., a storage capacity corresponding to N×K data blocks.

The controller 1 generates a logical address tag block when the number of data blocks accumulated in the write buffer 6 becomes equal to the number defined by (1 stripe)−(1 stripe segment+1 data block). The logical address tag block includes a logical address tag and a time stamp. The controller 1 stores the generated logical address tag block in the write buffer 6. Then, the controller 1 generates parity data corresponding to one stripe segment (K parity blocks) from data stored in the write buffer 6 and corresponding to (1 stripe−1 stripe segment). The data in the write buffer 6 includes the generated logical address tag block. Subsequently, the controller 1 starts collectively writing 1-stripe data in the disk array 2. The 1-stripe data includes data corresponding to (1 stripe−1 stripe segment) and generated parity data corresponding to 1 stripe segment. The 1-stripe data is written in physically consecutive areas of the free space of the (N+1) disk drives of the disk array 2. (In the embodiment shown in FIG. 1, N is 2, so that three disk drives 21–23 are employed.) The consecutive areas differ from the areas where the data to be updated is stored.

FIG. 2 shows an example of 1-stripe data the controller 1 prepares (when K=3) and illustrates how the 1-stripe data is written in the disk drives 21–23 of the disk array 2. In the example shown in FIG. 2, three stripe segments SS1, SS2 and SS3 are collectively written in the free areas of the disk drives 21, 22 and 23 as data D1, data D2 and data P, respectively. Data D1, data D2 and data P constitute one stripe. Stripe segment SS1 includes logical blocks (L3Data, L7Data and L11Data) corresponding to logical addresses L3, L7 and L11. Stripe segment SS2 includes logical blocks (L100Data and L1Data) corresponding to logical addresses L100 and L1, and a logical address tag block (LA-TAG). Stripe segment SS3 includes parity blocks P0, P1 and P2. Parity block P0 is a parity block corresponding to the logical blocks of logical addresses L3 and L100. Parity block P1 is a parity block corresponding to the logical blocks of logical addresses L7 and L1. Parity block P2 is a parity block corresponding to the logical block of logical address L11 and a logical address tag block (LA-TAG). In this example, parity block P0 is generated by obtaining an exclusive OR (XOR) between the logical blocks of logical addresses L3 and L100. Likewise, parity block P1 is generated by obtaining an exclusive OR (XOR) between the logical blocks of logical addresses L7 and L1, and parity block P2 is generated by obtaining an exclusive OR (XOR) between the logical block of logical address L11 and the logical address tag block.

The address translation table 7 arranged (stored) in the nonvolatile memory 3 is a translation map used for translating a logical address (a logical block address) into a physical address (a physical block address). By this address translation table 7, a data address the host 20 uses to designate an area on the disk array (namely, a logical address indicating a data block) is translated into a physical address indicating where on the disk array 2 the data block is stored.

FIG. 3 shows an example of a data structure of the address translation table 7. In the example shown in FIG. 3, each entry of the address translation table 7 corresponds to its own logical address. For efficient reference to the address translation table 7, an i-th entry of the table 7 is correlated with logical address i (a logical address of logical block i). The number of entries included in the address translation table 7 is equal to the total number of logical addresses used by the host 20. Information on the entries of the address translation table 7 (address translation information) includes fields, such as a logical address (logical block address) LA#, a physical stripe number ST#, a physical block number BLK#, a time stamp TS#, and flag F. The physical stripe number ST# indicates a physical stripe including a physical block which is assigned with a logical block specified by the corresponding logical address (logical block address) LA# and which is present (in the physical disk area) on the disk array 2. The physical block number BLK# indicates a relative position showing where the physical block is in the physical stripe specified by the physical stripe number ST#. Time stamp TS# is information used for managing the order in which data blocks of the corresponding logical addresses LA# are written in the disk array 2. The flag F shows that the data restoration process for the logical block of the corresponding logical address LA# has been completed (i.e., the case where F=1) or that it has not yet been completed (the case where F=0). Where the i-th entry (entry i) of the address translation table 7 is correlated with logical address i, as in the present embodiment, the i-th entry can be referred to based on the logical address i. It follows from this that the field for the logical address is not necessarily required. In a restoration-process address translation table employed in the second embodiment, however, a logical address field has to be prepared for each entry.

In the initial state in which the address translation table 7 has just been arranged (created) in the nonvolatile memory 3, valid data is shown only in the logical address field of the table 7. "NULL" is set in the other fields of each entry. Where "NULL" is set in the fields other than the logical address field, the corresponding logical address indicates an invalid logical block not used by the host 20. In the example shown in FIG. 3, logical address Li indicates such an invalid logical block. Where data different from "NULL" is set in the fields other than the logical address field, the corresponding logical addresses indicate valid logical blocks used by the host 20. In the example shown in FIG. 3, logical addresses L0, L1 and L2 indicate such valid logical blocks.

In the descriptions below, expressions such as "invalid logical address", "valid logical address", "logical address is valid" and "logical address is invalid" will be used for the sake of simplicity.

When the host 20 designates a logical address LA# (a logical block address) by a read or write request, the controller 1 translates the designated logical address LA# into a physical address (physical block address) comprising a physical stripe number ST# and a physical block number BLK#. This translation is executed in accordance with the address translation table 7.

If one of the disk drives 21–23 constituting the disk array 2 of the disk array apparatus 10 shown in FIG. 1 fails, the disk array 2 is reconstructed using the spare disk drive 24. For example, if disk drive 21 fails in the state shown in FIG. 2, the disk array 2 is reconstructed using the spare disk drive 24 in place of the failing disk drive 21. FIG. 4 shows how the disk array 2 is in such a condition. In FIG. 2, let us pay attention to the physical stripe made of data D1, D2 and P. Data D1 stored in the failing disk drive 21 is restored from data D2 and data P which are stored in normally-operating disk drives 22 and 23. To be more specific, data D1 is restored by executing an exclusive-OR operation between the same-position data blocks of the data D2 and P stored in the disk drives 22 and 23. As shown in FIG. 4, the restored data D1 is recorded in the spare disk drive 24 in such a manner that the recording area is of the same stripe as the areas where data D2 and data P are stored. In the conventional art, this data restoring operation is sequentially executed for all physical stripes of the disk array 2. In the present embodiment that uses the address translation table 7, the data restoring processing is executed only for physical stripes that contain physical blocks corresponding to valid logical addresses.

A description will now be given of the data restoring processing of the present embodiment with reference to the flowchart shown in FIG. 5. The data restoring processing is executed if one of the disk drives of the disk array 2 fails, and is intended to restore the data of the failing disk drive. The present embodiment is featured in that the use of the address translation table 7 enables complete restoration of data of valid logical addresses only. For this restoration, the controller 1 first sets variable i, which indicates the logical address of a logical block to be restored, at an initial value, for example at "0" (i=0) (step S501). Then, the controller 1 refers to the address translation table 7 stored in the non-volatile memory 3 and determines whether logical address i is valid (step S502). This determination is made by checking the entry corresponding to logical address i to see whether data different from "NULL" is set in the fields other than the field of "logical address LA#." A flag (a valid/invalid flag) may be provided for each of the entries of the address translation table 7 to show whether or not the corresponding logical address is valid. The validity of a logical address can be easily checked by referring to the corresponding flag.

When logical address i is valid (YES in step S502), i.e., when valid logical address i is searched for in the address translation table 7, the controller 1 determines whether or not data corresponding to logical address i is restored (step S503). This determination is made by referring to the entry corresponding to logical address i to see whether or not the flag F in that entry is valid or not. If the data corresponding to logical address i is not restored (NO in step S503), the controller 1 refers to the address translation table 7 and determines whether or not the physical block specified by the physical block number BLK# corresponding to logical address i is present in a failing disk drive (step S504). It should be noted that one physical block number BLK#1 is associated with one of the disk drives (disk drives 21–23 in the embodiment shown in FIG. 1) of the disk array 2 beforehand. Therefore, the determination in step S504 can be easily made on the basis of the physical block number BLK# corresponding to logical address i.

The specific determination in step S504 will be described referring to the case where the numbers of the physical blocks of the physical stripe to which the data blocks L3Data, L7Data, L11Data, L100Data, L1Data, LA-TAG, P0, P1 and P2 are assigned are 0, 1, 2, 3, 4, 5, 6, 7 and 8, respectively. In this case, the physical blocks of physical block numbers 0, 1 and 2 are present in disk drive 21. The physical blocks of physical block numbers 3, 4 and 5 are present in disk drive 22, and the physical blocks of physical block numbers 6, 7 and 8 are present in disk drive 23. Therefore, if disk drive 21 fails as in the case shown in FIG. 4, the failing disk drive 21 is determined to contain a physical block corresponding to physical block number 0, 1 or 2.

If the failing disk drive contains a physical block specified by the physical block number BLK# corresponding to logical address i (YES in step S504), the controller 1 executes step S505 in the manner described below. The controller 1 reads from the disk array 2 a physical stripe specified by the physical stripe number ST# set in the entry corresponding to logical address i, i.e., a physical stripe containing the physical block corresponding to logical address i. At the time, the data block stored in the failing disk drive is not read though it belongs to the same physical stripe. In the case shown in FIG. 4, step S505 is executed in such a manner that the controller 1 reads stripe segments, which are included in the physical stripe (incl., physical blocks) corresponding to logical address i, from normally-operating disk drives 22 and 23.

After reading the physical stripe corresponding to logical address i in step S505, the controller 1 restores the data blocks of the failing disk drive on the basis of the data of the read physical stripe (step S506). To be more specific, in the case where disk drive 21 fails as in FIG. 4, the data blocks stored in the failing disk drive 21 are restored based on parity blocks of disk drive 23 and data blocks of disk drive 22. The parity blocks are included in the physical stripe read by the controller 1. Assuming that the controller 1 reads the physical stripe shown in FIG. 2, data block L3Data of disk drive 21 is restored based on the exclusive-OR between parity block P0 and data block L100Data. Likewise, data block L7Data of disk drive 21 is restored based on the exclusive-OR between parity block P1 and data block L1Data, and data block L11Data of disk drive 21 is restored based on the exclusive-OR between parity block P2 and data block (logical address tag block) LA-TAG.

Then, the controller 1 determines whether a valid logical address is present in a logical address on the physical stripe read in step S505 (step S507). It should be noted that the "logical address on the physical stripe" is intended to mean a logical address that specifies a physical block included in the physical stripe. The determination in step S507 is made by referring to the address translation table 7 on the basis of the physical stripe number ST# of the physical stripe and searching for the entry in which the physical stripe number ST# is set. If the entry that meets the purpose is searched for, then the logical address LA# corresponding to that entry is determined to be a valid logical address on the physical stripe (YES in step S507). In this case, the controller 1 sets the flag F of the entry into a state showing the completion of restoration (F=1) (step S508). In this manner, the state where the (logical block of the) valid logical address has been restored is indicated. The controller 1 executes this step S508 with respect to all valid logical addresses on the physical stripe (steps S509 and S507). In other words, the controller 1 searches for all valid logical addresses to which physical blocks included in the physical stripe read in step S505 are assigned, and sets them into a state indicating the completion of restoration (steps S507–S509). As described, the present embodiment sets all valid logical addresses on the physical stripe including valid logical address i into a restoration-completed state, whether the logical addresses are those specifying logical blocks of the failing disk drive or those specifying logical blocks of the normally-operating drives. When a valid logical address on the physical stripe is newly designated as logical address i, step S503 determines that the data specified by the new logical address i is restored. In this case, the physical stripe corresponding to logical address i is not read. In other words, according to the present embodiment, the restored physical stripe is not read in vain.

After executing processing for all logical addresses on the physical stripe (YES in step S509), the controller 1 writes the restored data in the spare disk drive 24 (step S510). Then, the controller 1 increments logical address i by one to process the succeeding logical address (step S511). Subsequently, the controller 1 determines whether all logical addresses have been processed on the basis of the incremented i (logical address i) (step S512). If an unprocessed logical address is left (NO in step S512), the controller 1 returns to step S502 and executes the processing described above once again based on the incremented logical address i.

The processing described above is executed with respect to all logical addresses. Hence, even if disk drive 21 fails as in the case shown in FIG. 4, the data stored in that disk drive 21 is not lost. Specifically, the data in the physical blocks corresponding to a valid logical block is restored and held in the spare disk drive 24.

As described above, the present embodiment extracts all valid logical addresses on the basis of the address translation table 7 so as to restore data of a failing disk drive. Then, the controller 1 reads out, from the disk array 2, only those physical stripes whose physical blocks correspond to the valid logical addresses and are included in the failing disk drive. Based on the physical stripes read from out from the disk array 2, the data stored in the failing disk drive is restored. As can be seen from this, the present embodiment does not deal with all physical stripes that include the physical blocks corresponding to the valid logical addresses used by the host 20. Of all the physical stripes, physical stripes whose physical blocks are not included in the failing disk drive are ruled out from the physical stripes that are read for data restoration. As a result, the data restoration time of the disk array 2 can be significantly shortened.

[First Modification]

A description will be given of the first modification of the embodiment. The first modification is featured by the relocation of logical blocks. More specifically, when the valid logical blocks of a failing disk drive of the disk array 2 are restored, they are relocated on a new disk array 2 together with the valid logical blocks of the other disk drives. The feature of the first modification can be summarized in the following three points: first, an invalid logical block on the physical stripe is not relocated on the new disk array 2; second, what are accumulated in the write buffer are limited to the restored valid logical blocks of the failing disk drive and the valid logical blocks of normally-operating disk drives; and third, each time a predetermined number of blocks, for example logical blocks the number of which is defined as (1 stripe–[1 stripe segment+1 block]), have been accumulated in the write buffer 6, 1-stripe data including that predetermined number of logical blocks is written in physically consecutive areas of a free space of a disk drive constituting the new disk array 2. The consecutive areas differ from the areas in which the data to be updated is held.

With reference to the flowchart shown in FIG. 6, a description will be given as to how the first modification restores data in the disk array 2 if a disk drive of the disk array 2 fails. First of all, the controller 1 copies the address translation table 7 and records the resultant copy 70 in a different area of the nonvolatile memory 3, as shown in FIG. 7. In this manner, the copy 70 of the address translation table is prepared (step S601). Subsequent operations take place, using the copy 70 of the address translation table.

The controller 1 sets variable i, which indicates the logical address of a logical block to be restored, at 0 (i=0) (step S602). Then, the controller 1 refers to the copy 70 of the address translation table in the nonvolatile memory 3 and determines whether logical address i is valid (step S603). If logical address i is valid (YES in step S603), the controller 1 determines whether or not data corresponding to logical address i has been restored (step S604). If the data corresponding to logical address i has not yet been restored (NO in step S604), the controller 1 carries out step S605 as follows. From the disk array 2, the controller 1 reads a physical stripe specified by the physical stripe number which is set in an entry of the copy 70 of the address translation table 7 and which corresponds to logical address i. It should be noted that the data blocks (stripe segments) which are included in the physical stripe and stored in the failing disk drive are not read, as in the case of step S505.

After reading the physical stripe corresponding to logical address i in step S605, the controller 1 extracts a logical address tag block from the read physical stripe (step S606). If the logical address tag block is contained in the failing disk drive, it is restored based on the data included in the read physical stripe and stored in the other normally-operating disk drives. For example, if disk drive 22 fails in the state shown in FIG. 2, logical address tag block LA-TAG is restored based on logical block L11Data and parity block P2. The processing of restoring this logical address tag block is equivalent to the processing of extracting the logical address tag block from the read physical stripe.

Then, the controller 1 determines whether the logical addresses of the logical blocks to which the physical blocks included in the physical stripe read in step S605 are assigned include a valid logical address (step S607). This determination is made using the logical address tag block extracted in step S606 and the copy 70 of the address translation table. To be more specific, the determination in step S607 is made by picking up logical addresses from the logical address tag block one by one and by referring to the entries in which the logical addresses are set, by use of the copy 70 of the address translation table. If "NULL" is set in the fields other than the field of "logical address LA#" in the entries of the copy 70 of the address translation table, this means that the corresponding addresses are invalid. Conversely, if "NULL" is not set in the fields, the corresponding addresses are valid.

Only when a logical address extracted from the logical address tag block is valid (i.e., when a valid logical address is searched for in the logical address tag block), does the controller 1 restore data corresponding to that logical address and write the restored data (step S608). The restoration processing (step S608) of the data corresponding to the valid logical address varies depending upon whether or not the disk drive storing the logical block of that valid logical address fails. If the disk drive does fail, the restoration processing is to restore the logical block corresponding to the valid logical address in a similar manner to that of step S506. On the other hand, if the disk drive does not fail, the restoration processing is to extract the corresponding data block from the physical stripe read in step S605 and use the extracted data as restored data.

The write operation in step S608 may be executed in the high-speed write method described in the "Background of the Invention" or based on ordinary procedures. First, the controller 1 writes the restored logical block as data on the basis of the logical block and the corresponding logical address. The data is written with high density in free areas of the write buffer of the nonvolatile memory 3. Usually, step S608 is completed by writing the logical block in the write buffer 6. However, the write operation may result in the situation where the amount of write data accumulated in the write buffer 6 is equal to the amount defined by a predetermined number of blocks (e.g., the number defined by [1 stripe]–[1 stripe segment+1 data block]). In this case, the controller 1 performs a further write operation in step S608. To be more specific, the controller 1 generates a logical address tag block corresponding to the write data accumulated in the write buffer 6 (i.e., the data corresponding to ([1 stripe]–[1 stripe segment+1 data block]). Next, the controller 1 writes the generated logical address tag block in the last block area of the write buffer 6. Then, the controller 1 generates parity data corresponding to a 1 stripe segment from the data that is stored in the write buffer 6 immediately after the logical address tag block is written, i.e., from the data including the logical address tag block and corresponding to ([1 stripe]–[1 stripe segment]). The parity data corresponding to the 1 stripe indicates parity blocks corresponding to one stripe segment. Thereafter, the controller 1 collectively writes parity data corresponding to one stripe in the new disk array 2. The one-stripe data includes: data stored in the write buffer 6 and corresponding to (1 stripe–1 stripe segment); and the generated parity data corresponding to 1 stripe segment. The new disk array 2 is a disk array that has been reconstructed by replacing the failing disk drive with the spare disk drive 24. Where the failing disk drive is disk drive 21, the collective write operation is executed for areas which are those of the disk drives 22, 23 and 24 constituting the new disk array and which are different from the areas where the data to be updated is held. More specifically, the collective write operation is executed for physically consecutive areas selected from the free areas, in accordance with a new striping rule of the new disk array 2.

The striping rule is determined based on the number of disk drives constituting the RAID level of the disk array 2. In the first modification of the embodiment, the number of disk drives remains unchanged before and after the data restoration processing. Therefore, the new striping rule is essentially the same as the striping rule of the original disk array 2. Assuming that disk drive 21 fails and is replaced with the spare disk drive 24, the new striping rule is determined on the premise that the physical blocks of physical block numbers 0, 1 and 2 are present in disk drive 24, not in disk drive 21.

Each time one block is written in the write buffer in step S608, the controller 1 sets the flag F of the corresponding entry into a state showing the completion of restoration (F=1), based on the copy 70 of the address translation table corresponding to the logical address of that block (step S609). Furthermore, the controller 1 updates the copy 70 of the address translation table if a collective write operation for stripes is executed in step S608. The controller 1 updates the copy 70 of the address translation table in such a manner that the copy 70 reflects correct relationships between logical addresses LA# of the logical blocks of the stripe subjected to the collective write operation and the physical data position on the disk array 2 in which the logical blocks are written, i.e., the physical addresses indicated by both physical stripe numbers ST# and physical block numbers BLK#. To be more specific, the physical block numbers BLK# and the physical stripe numbers ST#, included in the entries which correspond to the logical addresses of the logical blocks of the stripe and which are present in the copy 70 of the address translation table 70, are updated such that they correctly specify the physical block positions of the physical stripe where logical blocks are actually written.

The controller 1 repeats the above-mentioned steps S607–S609 until all logical addresses corresponding to the physical blocks included in the physical stripe read in step S605 are processed (step S610). Then, the controller increments logical address i to process the succeeding logical address (step S611). Subsequently, the controller 1 determines whether all logical addresses have been processed on the basis of the incremented i (logical address i) (step S612). If an unprocessed logical address is left (NO in step S612), the controller 1 returns to step S603 and executes the processing described above once again based on the incremented logical address i. On the other hand, if all logical addresses have been processed (YES in step S612), the controller 1 replaces the original address translation table 7 with the copy 70 and uses this copy as a new address translation table 7 (step S613). Thereafter, the data restoration is brought to an end. The original address translation table 7 is deleted, and its copy 70 is used as a new address translation table thereafter.

Figure 6:
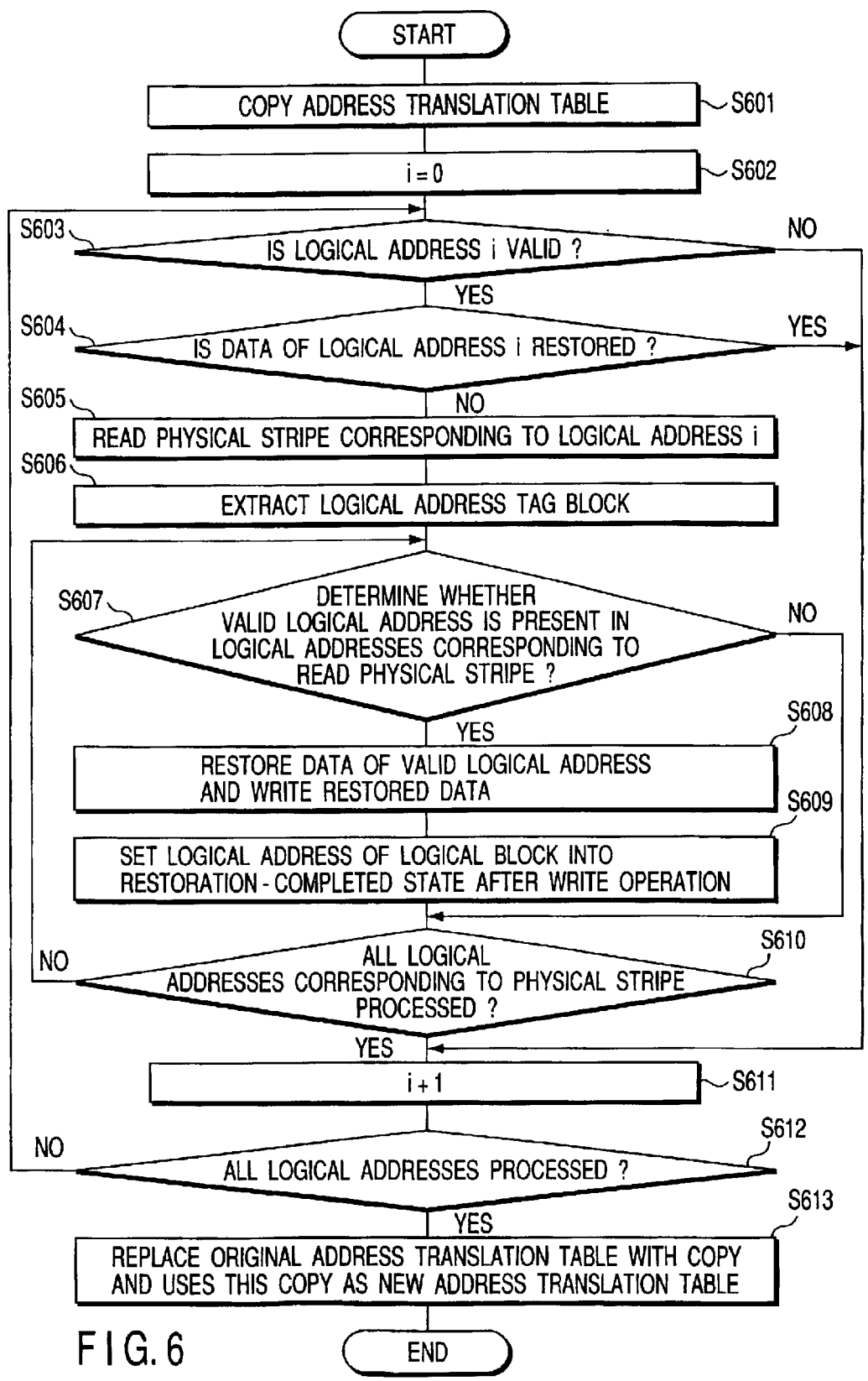
FIG. 6 is a flowchart illustrating the procedures of the data restoring processing according to the first modification of the embodiment.

According to the first modification of the embodiment, the valid logical blocks of a failing disk drive are restored in the disk array 2 that has been reconstructed using the spare disk drive 24 in place of the failing disk drive, and this data restoration process proceeds in accordance with the flowchart shown in FIG. 6. In other words, according to the first embodiment, the invalid logical blocks on the physical stripe are not relocated (held) as restored data. In addition, what are relocated on the new disk array 2 are limited to the valid logical blocks of a failing disk drive and the valid logical blocks of normally-operating disk drives. To be more specific, each time data including the restored valid logical blocks of the failing disk drive or the valid logical blocks of the normally-operating disk drives have been prepared in an amount corresponding to one stripe, they are relocated on the new disk array 2. As can be seen from this, in the first modification, the restoration of the data of the failing disk drive and the repacking of the data on the disk array 2 take place in parallel. Because of this feature, the data restoration time of the disk array can be remarkably short, and the repacking of data does not have to be performed after the restoration of data because of an increase in the free space of the disk array 2.

[Second Modification]

A description will be given of the second modification of the embodiment. The second modification is featured by the manner in which the valid logical blocks of a failing disk drive of the disk array 2 are relocated. When the valid logical blocks of the failing disk drive of the disk array 2 are restored, they are relocated on the new disk array 2, together with the valid logical blocks of the normally-operating disk drives of the disk array 2, in the order determined by logical and physical addresses. Unlike the first modification, the second modification fetches physical stripes in the order of valid logical addresses.

Figure 9:
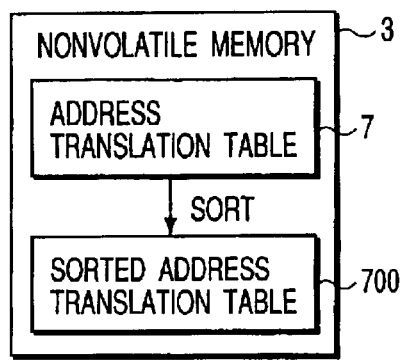
FIG. 9 illustrates a sorted address translation table used in the second modification.

With reference to the flowchart shown in FIG. 8, a description will be given as to how the second modification restores data in the disk array 2 if a disk drive of the disk array 2 fails. First of all, the controller 1 extracts address translation information on valid logical addresses from the address translation information stored in the address translation table 7 and sorts the extracted information, for example, in the ascending order of the valid logical addresses (step S801). As a result of this sorting, an address translation table 700 for restoration processing is generated in an area of the nonvolatile memory 3, as shown in FIG. 9 (the table 700 will be referred to as a sorted address translation table). A high-speed sort algorithm conventionally known in the art, such as "merge-sort", "quick-sort", "shell-sort" or "heap-sort", may be applied to this sorting operation. It should be noted that the extracted address translation information may be sorted in the descending order of the valid logical addresses. When the i-th entry of the address translation table 7 is associated with logical address i, the entries in the table 7 are arranged in the ascending order of the logical addresses. In this case, no particular sort algorithm is needed.

After step S801, the controller 1 executes the processing of steps S602–S612 shown in FIG. 6, using the sorted address translation table 700 (step S802). Thus, the second modification differs from the first modification in the following point. In the first modification, a copy 70 of the address translation table 7 is made, and restoration processing is performed based on the copy 70. In the second modification, in contrast, the address translation table 700 is a table sorted in the ascending order of valid logical addresses, and restoration processing is performed based on the shorted address translation table 700.

By executing step S802 (namely, steps S602–S612 shown in FIG. 6) based on the sorted address translation table 700, data of the new disk array 2 is restored as follows. First, the physical stripe corresponding to the order of valid logical addresses is extracted (step S605). Each time the physical stripe corresponding to a valid logical address is extracted, the logical blocks of all valid logical addresses are restored based on the physical stripe (step S608). In this step S608, the restored data are written in the write buffer 6. In step S608, each time data including valid logical blocks of the failing disk drive or the valid logical blocks of normally-operating disk drives have been accumulated in the write buffer 6 in an amount corresponding to (1 stripe–1 stripe segment), 1-stripe data containing the data are collectively written in the new disk array 2. As a result, the 1-stripe data are relocated on the disk drives of the new disk array 2 in such a manner that they are stored in areas different from those where the data to be updated are held. At the time, the information on the entries which are contained in the address translation table 700 and which correspond to the logical addresses of the logical blocks constituting the relocated stripe of the disk array 2, are updated in such a manner that they represent the physical addresses of the relocated data.

As describe above, according to the second modification, the restoration of data and the relocation of the data on disk array 2 are executed in parallel in the order of logical addresses. Because of this feature, the data restoration time of the disk array 2 can be remarkably short. In addition, defragmentation is not required after the data restoration. Even if it is not executed, valid logical blocks can be relocated in logically and physically consecutive areas of the disk array 2 at least in the corresponding stripe. If the logical addresses of the logical blocks constituting different stripes are consecutive, the stripes are arranged in physically consecutive areas.

After step S802 in FIG. 8 is executed, the controller 1 adopts the sorted address translation table (the address translation table used for restoration processing) 700 as a new address translation table 7, replacing the original address translation table 7 (S803). Then, the controller 1 brings the data restoration processing to an end, and the original address translation table 7 is deleted. In the subsequent operations, the address translation table 700 for restoration processing is used as a new address translation table 7. The address translation information of this new address translation table 7 is sorted in the ascending order of valid logical addresses and therefore has a data structure different from that shown in FIG. 3. In order to acquire a new address translation table having such a data structure as shown in FIG. 3, the following operation is possible. That is, in step S801, a copy of the address translation table 7 (equivalent to copy 70 of the address translation table used in the first modification) is generated independently of the address translation table 700 sorted for restoration processing.

In this case, each time data are written (relocated) in the new disk array 2 in units of one stripe, the entries which are contained in the copy of the address translation table and which correspond to the logical addresses of the logical blocks of the stripe are updated, as in the first modification. At the end of the data restoration processing, the copy of the address translation table is adopted as a new address translation table 7.

Figure 10:
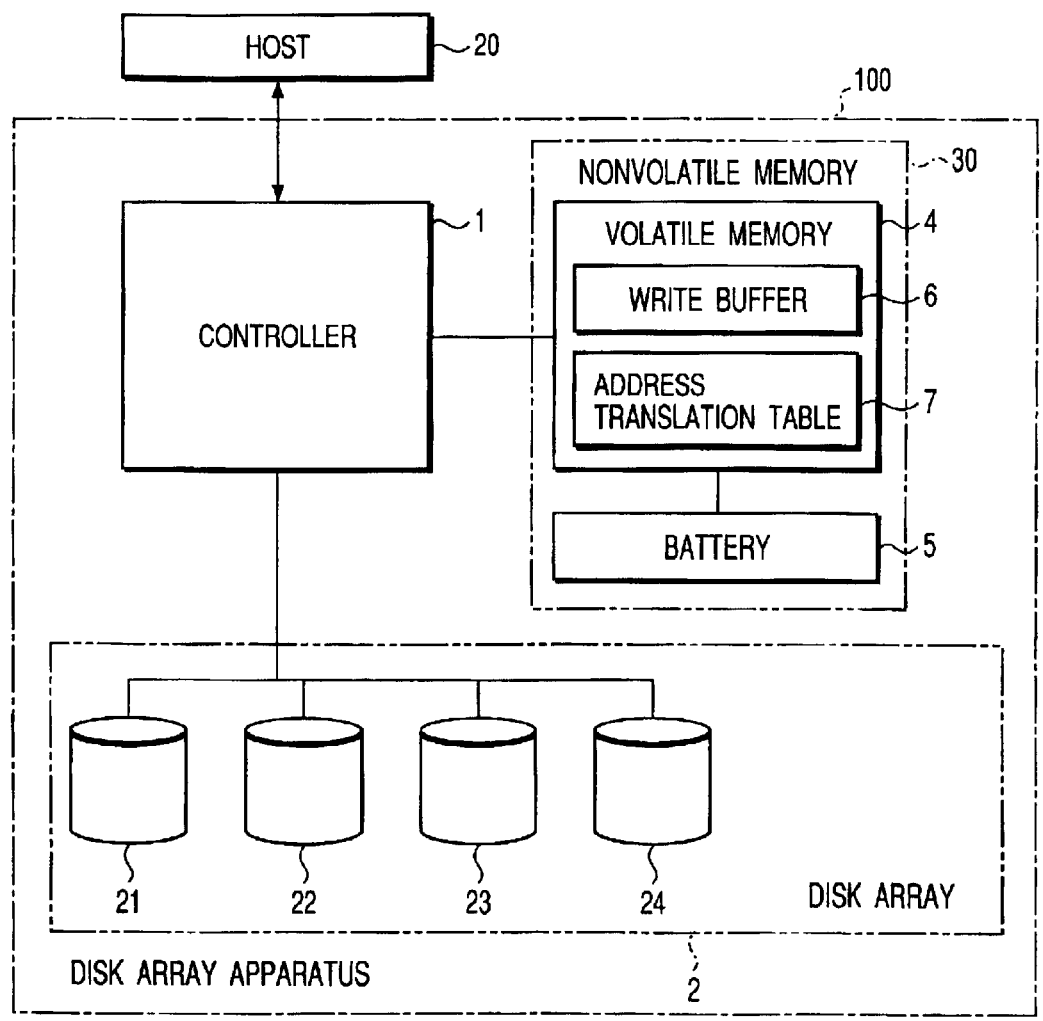
FIG. 10 is a block diagram illustrating a computer system which is provided with a disk array apparatus according to another embodiment of the present invention.

In the embodiment of the present invention and its modifications, the write buffer 6 and the address translation table 7 are arranged in the nonvolatile memory 3. However, the write buffer 6 and the address translation table 7 may be provided in a volatile memory 4, as in the disk array apparatus 100 shown in FIG. 10, for example. In this case, it is necessary to prevent the data in the volatile memory 4 from getting lost when the disk array apparatus 100 is turned off. This is attained by backing up the volatile memory 4 by use of a memory backup mechanism, such as a battery, and the volatile memory 4, thus backup up, is functionally equivalent to the nonvolatile memory 3 shown in FIG. 1. In other words, the write buffer 6 and the address translation table 7 may be arranged in the nonvolatile memory 30 that includes the volatile memory 4 and the battery 5 (memory backup mechanism).

The embodiment and its modifications are based on the assumption that the disk array 2 is of a redundancy disk configuration according to RAID4. However, the present invention may be applied to a disk array of a RAID level other than RAID4. For example, it may be applied to a disk array of RAID5, wherein the disk drive that stores a parity block cyclically switches from one to another in units of one physical stripe. In addition, the present invention can be applied to a disk array having a redundancy configuration of RAID50. In conclusion, the present invention is applicable to disk arrays of any type of redundancy disk configuration, as long as the redundancy disk configuration enables restoration of data.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk array apparatus including a disk array which is made up of a plurality of disk drives, has a redundancy disk configuration, and is regarded as one logical disk drive by a host computer, said disk array apparatus comprising:
   means for storing an address translation table including address translation information, said address translation information being used for translating a logical address the host computer uses for specifying a valid logical block into a physical address indicating where in the disk array the logical block is stored;
   a write buffer in which data to be written in the disk array is accumulated;
   first searching means for searching for a valid logical address in accordance with the address translation table, said first searching means operating if one of the disk drives of the disk array fails and the disk array is reconstructed using a spare disk drive in place of the failing disk drive;
   means for reading from the disk array a physical stripe including the physical block corresponding to the logical block of the valid logical address searched for by the first searching means;
   second searching means for searching for a valid logical address based on the address translation table from among logical addresses of logical blocks corresponding to physical blocks included in the physical stripe read by the reading means;
   means for restoring valid data of the failing disk drive and which corresponds to the valid logical address searched for by the second search means, said valid data being restored based on the physical stripe read by the reading means;
   first writing means for writing data in the write buffer in units of one block, the data written by the first writing means including data which is stored in the failing disk drive and restored by the restoring means, and data which is included in the physical stripe read by the reading means, corresponds to the valid logical address searched for by the second searching means, and is data other than that stored in the failing disk drive; and
   second writing means for writing 1-stripe data including data corresponding to a predetermined number of blocks, each time the data corresponding to the predetermined number of blocks is accumulated in the write buffer, said 1-stripe data being written in a free area of a new disk array that uses a spare disk drive in place of the failing disk drive, said free area being different from an area where data which is stored in disk drives of the new disk array and which is to be updated is held.

2. A disk array apparatus according to claim 1, wherein the address translation information included in the address translation table includes flag information which is set in a restoration-completed state when the restoring means restores data of a corresponding logical address, and
   the reading means does not read a physical stripe corresponding to the valid logical address searched for by the first searching means if the flag information corresponding to the valid logical address is set in the restoration-completed state.

3. A disk array apparatus according to claim 1, wherein said physical stripe includes:
   logical blocks whose number is defined by ([1 stripe]-[1 stripe segment+1 data block]);
   one logical address tag block including logical addresses of the logical blocks; and parity blocks being defined by a number of blocks of one stripe segment, the number of blocks of one stripe segment corresponding to ([1 stripe]-[1 stripe segment]) that includes the logical blocks whose number is defined by ([1 stripe]-[1 stripe segment+1 data block]) and the logical address tag block;
   said second searching means searches for valid logical addresses by checking logical addresses of a logical address tag block included in the physical stripe read by the reading means in accordance with the address translation table.

4. A disk array apparatus according to claim 3, wherein said restoring means restores a logical address tag block based on the physical stripe read by the reading means if the logical address tag block is stored in the failing disk drive.

5. A disk array apparatus according to claim 1, further comprising means for making a copy of the address translation table in an area different from the address translation table of the storing means when the disk array is reconstructed,
   wherein the first and second searching means make use of the copy of the address translation table.

6. A disk array apparatus according to claim 5, further comprising means for updating address translation information contained in the copy of the address translation table with respect to each of the logical addresses of the logical blocks included in one stripe, when the second writing means writes data corresponding to said one stripe.

7. A disk array apparatus according to claim 6, further comprising means for replacing the address translation table with the copy thereof as a new address translation table, when data corresponding to all valid logical addresses are written in the new disk array and corresponding address translation information included in the copy of the address translation table are updated.

8. A disk array apparatus according to claim 1, further comprising means for generating a sorted address translation table in an area different from an area where the address translation table of the storing means is stored, when the new disk array is reconstructed, the sorted address translation table being obtained by sorting the address translation information set in the address translation table in an order defined by valid logical addresses,
   wherein the first and second searching means make use of the sorted address translation table.

9. A disk array apparatus according to claim 1, further comprising means for updating address translation information contained in the sorted address translation table with respect to each of the logical addresses of the logical blocks included in one stripe, when the second writing means writes data corresponding to said one stripe.

10. A disk array apparatus according to claim 9, further comprising means for replacing the address translation table with the copy thereof as a new address translation table, when data corresponding to all valid logical addresses are written in the new disk array and corresponding address translation information included in the sorted address translation table are updated.

11. A method for restoring data stored in a disk array which is made up of a plurality of disk drives, has a redundancy disk configuration, and is regarded as one logical disk drive by a host computer, said method being used when one of the disk drives constituting the disk array fails, said method comprising:
   sequentially searching for valid logical addresses in accordance with an address translation table including address translation information, said searching being performed for all logical addresses manageable by the host computer if the disk array is reconstructed using a spare disk drive in place of the failing disk drive, said address translation information being used for translating a logical address the host computer uses for specifying a valid logical block into a physical address indicating where in the disk array the logical block is stored;

reading from the disk array a physical stripe including the physical blocks corresponding to the valid logical blocks;

searching for valid logical addresses in accordance with the address translation table from among the logical addresses of logical blocks corresponding to physical blocks included in the read physical stripe;

restoring valid data which is stored in the failing disk drive and which corresponds to the valid logical addresses searched for from among the logical addresses of the logical blocks corresponding to physical blocks included in the read physical stripe, said valid data being restored based on the read physical stripe;

writing data in the write buffer in units of one block, the written data including data which is stored in the failing disk drive and restored, and valid data which corresponds to valid logical addresses searched for in the logical addresses of the logical blocks corresponding to the physical blocks included in the read physical stripe and which is data other than that stored in the failing disk drive; and writing 1-stripe data including data corresponding to a predetermined number of blocks, each time the data corresponding to the predetermined number of blocks is accumulated in the write buffer, said 1-stripe data being written in a free area of a new disk array that uses a spare disk drive in place of the failing disk drive, said free area being different from an area where data which is stored in disk drives of the new disk array and which is to be updated is held.

12. A method according to claim 11, wherein said physical stripe includes: logical blocks whose number is defined by ([1 stripe]–[1 stripe segment+1 data block]); one logical address tag block including logical addresses of the logical blocks; and parity blocks being defined by a number of blocks of one stripe segment, the number of blocks of one stripe segment corresponding to ([1 stripe]–[1 stripe segment]) that includes the logical blocks whose number is defined by ([1 stripe]–[1 stripe segment+1 data block]) and the logical address tag block; and valid logical addresses of the logical addresses of the logical blocks corresponding to the physical blocks included in the read physical stripe are searched for by checking logical addresses of a logical address tag block included in the physical stripe in accordance with the address translation table.

13. A method according to claim 11, wherein valid logical addresses are searched for from among all logical addresses manageable by the host computer, by checking said all logical addresses in accordance with the address translation table while simultaneously arranging said all logical addresses in a predetermined address direction.

* * * * *

UNITED STATES PATENT AND TRADEMARK OFFICE
CERTIFICATE OF CORRECTION

PATENT NO. : 6,912,614 B2
DATED : June 28, 2005
INVENTOR(S) : Tomita

Page 1 of 1

It is certified that error appears in the above-identified patent and that said Letters Patent is hereby corrected as shown below:

<u>Column 16,</u>
Line 46, change "claim 1," to -- claim 8, --.

Signed and Sealed this

Twenty-third Day of August, 2005

JON W. DUDAS
*Director of the United States Patent and Trademark Office*